US012619475B2

(12) United States Patent
Chibon et al.

(10) Patent No.: US 12,619,475 B2
(45) Date of Patent: May 5, 2026

(54) APPLICATION EXECUTION ENVIRONMENT SELECTION BASED ON RESOURCE USAGE PROFILES

(71) Applicant: Red Hat, Inc., Raleigh, NC (US)

(72) Inventors: Pierre-Yves Chibon, Paris la Défense (FR); Leigh Griffin, Waterford (IE)

(73) Assignee: Red Hat, LLC, Raleigh, NC (US)

(*) Notice: Subject to any disclaimer, the term of this patent is extended or adjusted under 35 U.S.C. 154(b) by 1120 days.

(21) Appl. No.: 17/460,849

(22) Filed: Aug. 30, 2021

(65) Prior Publication Data
US 2023/0062604 A1 Mar. 2, 2023

(51) Int. Cl.
*G06F 9/50* (2006.01)
*G06F 11/34* (2006.01)

(52) U.S. Cl.
CPC .......... *G06F 9/5083* (2013.01); *G06F 9/5044* (2013.01); *G06F 11/3414* (2013.01); *G06F 11/3466* (2013.01)

(58) Field of Classification Search
CPC .. G06F 9/5083; G06F 9/5044; G06F 11/3414; G06F 11/3466
See application file for complete search history.

(56) References Cited

U.S. PATENT DOCUMENTS

| | | | | |
|---|---|---|---|---|
| 6,086,618 | A * | 7/2000 | Al-Hilali | G06F 11/3447 |
| | | | | 703/2 |
| 8,087,025 | B1 * | 12/2011 | Graupner | G06F 9/505 |
| | | | | 718/104 |
| 9,722,945 | B2 | 8/2017 | Siciliano et al. | |
| 10,511,481 | B1 * | 12/2019 | Castellanos | H04L 41/0883 |
| 11,138,049 | B1 * | 10/2021 | Featonby | G06F 11/3447 |
| 11,868,802 | B2 * | 1/2024 | Griffin | G06F 9/5088 |
| 2010/0082319 | A1 * | 4/2010 | Cherkasova | G06F 11/3428 |
| | | | | 703/22 |
| 2010/0082321 | A1 * | 4/2010 | Cherkasova | G06F 11/3447 |
| | | | | 703/22 |
| 2012/0079497 | A1 * | 3/2012 | Gangemi | G06F 9/5011 |
| | | | | 718/104 |

(Continued)

FOREIGN PATENT DOCUMENTS

| | | |
|---|---|---|
| CN | 111427668 A | 7/2020 |
| CN | 112214303 A | 1/2021 |

(Continued)

OTHER PUBLICATIONS

Notice of Allowance and Notice of Allowability for U.S. Appl. No. 17/371,651 mailed Sep. 5, 2023, 17 pages.

(Continued)

*Primary Examiner* — Benjamin C Wu
(74) *Attorney, Agent, or Firm* — Dority & Manning, P.A.

(57) ABSTRACT

A plurality of resource usage profiles is generated, wherein at least two of the resource usage profiles each include a corresponding plurality of resource values that quantify real-time computing resources used by an instance of an application that previously executed under two different corresponding operating conditions. It is determined that a new instance of the application is to be initiated. A particular resource usage profile from the plurality of resource usage profiles is selected. The new instance is initiated using the particular resource usage profile.

20 Claims, 8 Drawing Sheets

(56) References Cited

U.S. PATENT DOCUMENTS

| | | | | |
|---|---|---|---|---|
| 2012/0185867 A1* | 7/2012 | Archer | | G06F 9/5066 |
| | | | | 718/105 |
| 2012/0284408 A1* | 11/2012 | Dutta | | G06F 9/5066 |
| | | | | 709/226 |
| 2013/0036208 A1* | 2/2013 | Dochez | | G06F 9/5077 |
| | | | | 709/220 |
| 2016/0191617 A1 | 6/2016 | Hintermeister et al. | | |
| 2017/0199752 A1* | 7/2017 | Cao | | G06F 11/3409 |
| 2019/0018671 A1* | 1/2019 | Zhu | | H04L 67/1008 |
| 2020/0110691 A1* | 4/2020 | Bryant | | G06F 11/3457 |
| 2021/0064433 A1 | 3/2021 | Nakfour | | |
| 2021/0067406 A1* | 3/2021 | Myers | | G06F 11/3409 |
| 2021/0096913 A1 | 4/2021 | Nadeau et al. | | |
| 2021/0103499 A1 | 4/2021 | Alluboyina et al. | | |
| 2021/0109732 A1 | 4/2021 | Mitra | | |
| 2021/0109789 A1 | 4/2021 | McWeeney | | |
| 2022/0276953 A1* | 9/2022 | Padala | | G06F 11/3433 |
| 2023/0062604 A1* | 3/2023 | Chibon | | G06F 11/3414 |
| 2023/0078091 A1* | 3/2023 | Iyer | | G06F 11/3428 |
| | | | | 717/124 |
| 2025/0086087 A1* | 3/2025 | Mo | | G06F 11/3698 |
| 2025/0094307 A1* | 3/2025 | Lebdeh | | G06F 11/302 |

FOREIGN PATENT DOCUMENTS

| | | |
|---|---|---|
| CN | 112306634 A | 2/2021 |
| CN | 112527349 A | 3/2021 |

OTHER PUBLICATIONS

Author Unknown, "Autoscale a load-balanced web application," Oracle, Dec. 4, 2020, 5 pages.

Author Unknown, "AWS Auto Scaling," Amazon, available as early as Jul. 7, 2021, https://aws.amazon.com/autoscaling/, 7 pages.

Hillier, A., "Cloud Autoscaling Explained," Densify, available as early as Apr. 1, 2021, https://www.densify.com/articles/autoscaling, 6 pages.

Campbell, P., "Strategic Monitoring for Hybrid Cloud Infrastructure Provisioning," CloudBolt Software, Inc., accessed Apr. 9, 2021 from https://www.cloudbolt.io/blog/strategic-monitoring-for-hybrid-cloud-infrastructure-provisioning/, 4 pages.

Sivakumar, S., "New full stack monitoring capabilities in Azure Monitor," Azure Monitoring & Diagnostics, Sep. 24, 2018, https://azure.microsoft.com/en-US/blog/new-full-stack-monitoring-capabilities-in-azure-monitor, 8 pages.

* cited by examiner

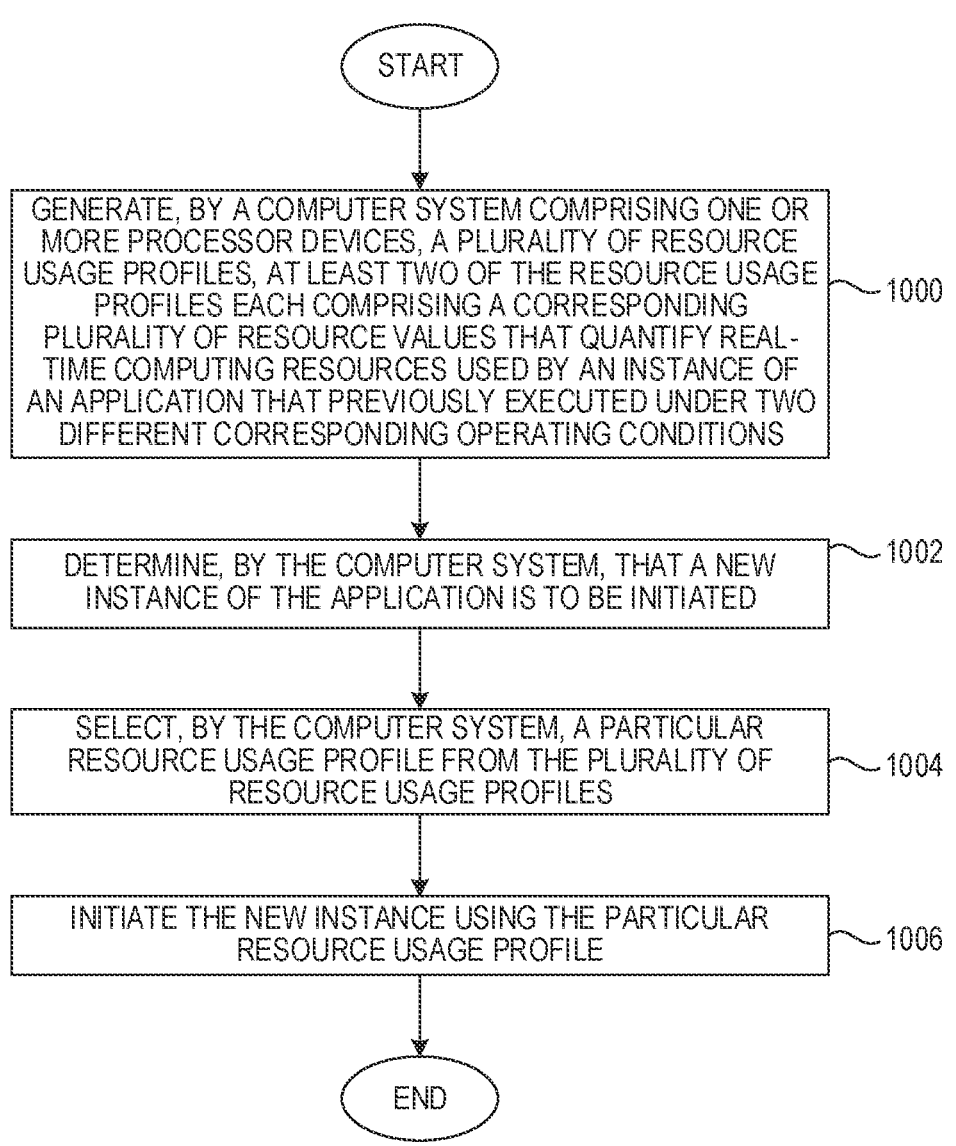

START

GENERATE, BY A COMPUTER SYSTEM COMPRISING ONE OR MORE PROCESSOR DEVICES, A PLURALITY OF RESOURCE USAGE PROFILES, AT LEAST TWO OF THE RESOURCE USAGE PROFILES EACH COMPRISING A CORRESPONDING PLURALITY OF RESOURCE VALUES THAT QUANTIFY REAL-TIME COMPUTING RESOURCES USED BY AN INSTANCE OF AN APPLICATION THAT PREVIOUSLY EXECUTED UNDER TWO DIFFERENT CORRESPONDING OPERATING CONDITIONS ~1000

DETERMINE, BY THE COMPUTER SYSTEM, THAT A NEW INSTANCE OF THE APPLICATION IS TO BE INITIATED ~1002

SELECT, BY THE COMPUTER SYSTEM, A PARTICULAR RESOURCE USAGE PROFILE FROM THE PLURALITY OF RESOURCE USAGE PROFILES ~1004

INITIATE THE NEW INSTANCE USING THE PARTICULAR RESOURCE USAGE PROFILE ~1006

END

*FIG. 3*

APPLICATION EXECUTION ENVIRONMENT SELECTION BASED ON RESOURCE USAGE PROFILES

BACKGROUND

Different applications executing on a computing device may use different amounts of computing resources, such as memory resources, processor resources, network resources, and storage device resources. The same application may even use different amounts of computing resources under different operating conditions, such as during a very heavy load time versus a light load time, or at different times of the day.

SUMMARY

The examples disclosed herein monitor computing resource utilization of an instance of an application executing under a particular operating condition. A resource usage profile is generated that includes resource values that quantify the real-time computing resources used by the instance under the particular operating condition. The resource usage profile is subsequently used to initiate additional instances of the application to ensure the instance has sufficient computing resources.

In one implementation a method is provided. The method includes generating, by a computer system comprising one or more processor devices, a plurality of resource usage profiles, at least two of the resource usage profiles each comprising a corresponding plurality of resource values that quantify real-time computing resources used by an instance of an application that previously executed under two different corresponding operating conditions. The method further includes determining, by the computer system, that a new instance of the application is to be initiated. The method further includes selecting, by the computer system, a particular resource usage profile from the plurality of resource usage profiles, and initiating the new instance using the particular resource usage profile.

In another implementation a computer system is provided. The computer system includes one or more processor devices of one or more computing devices. The one or more processor devices are to generate a plurality of resource usage profiles, at least two of the resource usage profiles each comprising a corresponding plurality of resource values that quantify real-time computing resources used by an instance of an application that previously executed under two different corresponding operating conditions. The one or more processor devices are further to determine that a new instance of the application is to be initiated. The one or more processor devices are further to select a particular resource usage profile from the plurality of resource usage profiles, and initiate the new instance using the particular resource usage profile.

In one implementation a non-transitory computer-readable storage medium is provided. The non-transitory computer-readable storage medium includes executable instructions to cause one or more processor devices to generate a plurality of resource usage profiles, at least two of the resource usage profiles each comprising a corresponding plurality of resource values that quantify real-time computing resources used by an instance of an application that previously executed under two different corresponding operating conditions. The instructions are further to cause the one or more processor devices to determine that a new instance of the application is to be initiated. The instructions are further to cause the one or more processor devices to select a particular resource usage profile from the plurality of resource usage profiles, and initiate the new instance using the particular resource usage profile.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 3 is a flowchart of a method for application execution environment selection based on resource usage profiles according to one implementation;

DETAILED DESCRIPTION

Figure 1:
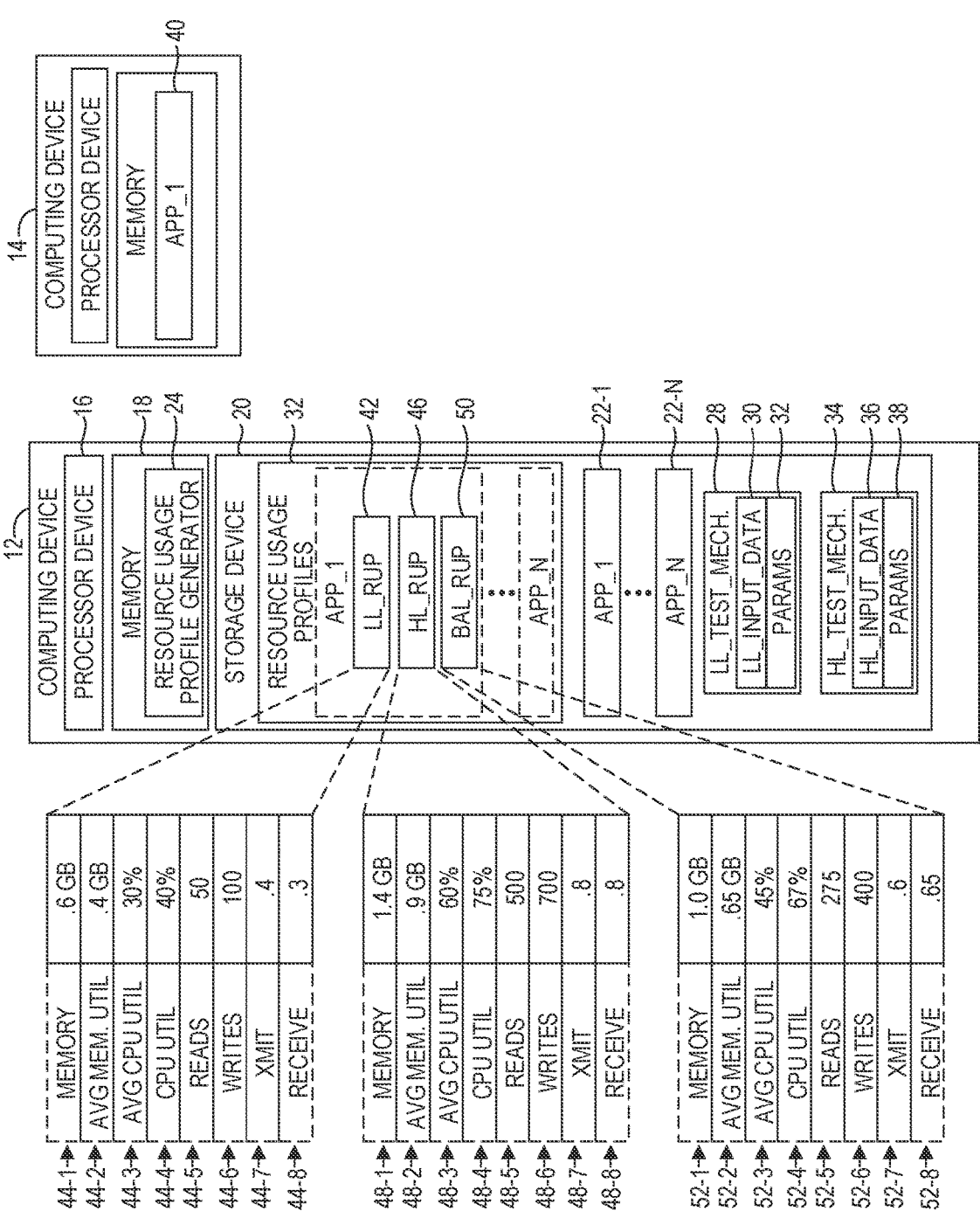
FIG. 1 is a block diagram of an environment suitable for generating one or more resource usage profiles that can subsequently be used for application execution environment selection according to one implementation.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Different applications executing on a computing device may use different amounts of computing resources, such as memory resources, processor resources, network resources, and storage device resources. The same application may even use different amounts of computing resources under different operating conditions, such as during a very heavy load time versus a light load time, or at different times of the day.

Many execution environments, such as some cloud computing environments, may automatically initiate a copy, or instance, of an application in response to some event, such as a schedule, a programmatic or operator request, or to increase a number of instances of the application during times of heavy demand. Such environments may automatically select a particular computing device from a set of computing devices, and initiate the instance of the application. In the absence of any knowledge of the computing resources that the instance of the application is likely to use, the instance may be initiated on a computing device that does not have sufficient computing resources for the instance of the application. This may negatively impact not only the instance of the application, but any other applications already running on the computing device as each application is competing for a finite amount of computing resources. The instance of the application may not be able to provide acceptable service, and each other application executing on the computing device may experience reduced performance.

Some computing environments initiate instances of applications in virtual machines (VMs) to isolate the applications of one tenant, such as a customer of a cloud computing environment provider, that are executing on a same physical computing device as another tenant. Virtual machines may be allocated certain resources, such as virtual central processing units (VCPUs), memory, network transceivers, and/or disk storage, that are hopefully sufficient for the VM and any instances of applications executing in the VM to execute. However, in the absence of any knowledge of the computing resources that an instance of the application is likely to use, a VM may be allocated more computing resources than are needed for an instance of an application to properly execute. Such an overallocation of computing resources may reduce the amount of computing resources that may be used by other VMs on the same computing device, resulting in an inefficient use of computing resources. Alternatively, the VM may not be allocated sufficient computing resources for the instance of the application to properly execute.

The examples disclosed herein monitor computing resource utilization of an instance of an application executing under a particular operating condition. A resource usage profile is generated that includes resource values that quantify the real-time computing resources used by the instance under the particular operating condition. An application initiator that operates to initiate instances of applications determines that an instance of the application is to be initiated. The application initiator accesses the resource usage profile to select a particular computing device from a set of computing devices to ensure the selected computing device has sufficient resources to execute the instance based on the resource usage profile. In other implementations, the application initiator may use the resource usage profile to set appropriate computing resource parameters for a VM that is initiated to execute an instance of the application so that the VM is allocated an appropriate amount of resources to execute the instance.

FIG. 1 is a block diagram of an environment 10 suitable for generating one or more resource usage profiles according to one implementation. The environment 10 includes a computing device 12 and a computing device 14. The computing device 12 has one or more processor devices 16 and a memory 18. The computing device 12 includes, or is communicatively coupled to, a storage device 20. The storage device 20 may include one or more applications 22-1-22-N (generally, applications 22). An application 22 comprises one or more files of programmable instructions and data that, when initiated on a computing device, provide some desired functionality, such as an online web store, a scientific calculator, an investment service, an online banking service, or the like.

The memory 18 includes a resource usage profile generator 24 that is configured to generate a plurality of resource usage profiles for the applications 22-1-22-N. A light load test mechanism 28 is generated for the application 22-1. The light load test mechanism 28 may include input data 30 and parameters 32. The input data 30 may comprise input transactions expected by an instance of the application 22-1, depending on the functionality implemented by the application 22. For example, if the application 22-1 is a search engine, the input data 30 may comprise search transactions. If the application 22-1 is an online web store, the input data 30 may include product purchase transactions. The parameters 32 may comprise instructions regarding how the input data 30 is provided to an instance of the application 22-1. For example, the parameters 32 may indicate that transactions are to be provided at a rate of 1 per second or 2 per second, or the parameters may indicate that multiple transactions are to be submitted concurrently to the instance of the application 22-1 at a particular rate.

A heavy load test mechanism 34 is also generated for the application 22-1. The heavy load test mechanism 34 may include input data 36 and parameters 38. The input data 36 comprises input transactions expected by the instance of the application 22-1, depending on the functionality implemented by the application 22. The parameters 38 comprise instructions regarding how the input data 36 is provided to an instance of the application 22-1. The heavy load test mechanism 34 is designed to require greater computer resource utilization by the instance of the application 22-1 than that of the light load test mechanism 28. For example, the input data 36 may be more complex and require more processing than the input data 30, and/or the parameters 38 may require a greater number of transactions be provided to the instance of the application 22-1 at a greater rate than that of the parameters 32.

A test instance 40 of the application 22-1 is initiated on the computing device 14. As used herein, the term "instance" refers to an executing instantiation of an application 22. The term "test" in this context means that the instance 40 is not for use by end users; the instance 40 is initiated for the purposes of generating resource usage profiles that will be used to initiate subsequent instances of the application 22-1. The test instance 40 may be initiated by an operator (not illustrated), the resource usage profile generator 24, or by any other initiation mechanism.

The resource usage profile generator 24 initiates a light load test process to generate a resource usage profile that corresponds to a light load operating condition of the test instance 40. The resource usage profile generator 24 provides the input data 30 to the test instance 40 in accordance with the parameters 32. The resource usage profile generator 24 concurrently obtains real-time computing resources from the computing device 14 over a period of time as the input data 30 is being provided to the test instance 40 in accordance with the parameters 32. The real-time computing resources may be obtained, for example, by iteratively sending requests to an operating system of the computing device 14 for information that identifies computing resources used by the test instance 40. The real-time computing resources may include, by way of non-limiting example, processor utilization, memory utilization, reads and writes to storage devices, transmit and receive networking activity, and the like. By iteratively requesting the information that identifies computing resources used by the test instance 40, rates of computing resource utilization can be determined, such as reads or writes per unit of time, average processor utilization per unit of time, average memory utilization per unit of time, and the like.

Based on the real-time computing resources, the resource usage profile generator 24 generates a light load resource usage profile 42 that includes a plurality of resource values 44-1-44-8 that quantify the real-time computing resources used by the test instance 40 during the light load test process. In this example, the light load resource usage profile 42 includes a resource value 44-1 that quantifies a real-time amount of memory usage of the test instance 40. The resource value 44-2 quantifies a real-time average amount of memory usage of the test instance 40 over a predetermined period of time, such as one second, five seconds, ten seconds, one minute, or over the entire duration of the light load test process.

The resource value 44-3 quantifies an amount of processor device usage of the test instance 40 over a predetermined period of time. The resource value 44-4 quantifies an instantaneous amount of processor device usage of the test instance 40. The resource value 44-5 quantifies a number of storage device reads that the test instance 40 initiated over a predetermined period of time, in this example, 1 second. The resource value 44-6 quantifies a number of storage device writes that the test instance 40 initiated over a one-second period of time. The resource value 44-7 quantifies an amount, in megabytes, of data that was transmitted onto a network by the test instance 40 over a period of time. The resource value 44-8 quantifies an amount, in megabytes, of data that was received by the test instance 40 over the network over a period of time.

The resource usage profile generator 24 initiates a heavy load test process to generate a resource usage profile that corresponds to a heavy load operating condition of the test instance 40. The resource usage profile generator 24 may first terminate the test instance 40 and initiate another test instance, or initiate the heavy load test process with the test instance 40. In this example, the resource usage profile generator 24 provides the input data 36 to the test instance 40 in accordance with the parameters 38. The resource usage profile generator 24 concurrently obtains real-time computing resources from the computing device 14 over a period of time as the input data 36 is being provided to the test instance 40 in accordance with the parameters 38. Based on the real-time computing resources, the resource usage profile generator 24 generates a heavy load resource usage profile 46 that includes a plurality of resource values 48-1-48-8 that quantify the real-time computing resources used by the test instance 40 during the heavy load test process. The resource values 48-1-48-8 correspond to the same computing resources as the resource values 44-1-44-8, but may have greater values due to the heavier load provided to the test instance 40 during the heavy load test process.

The resource usage profile generator 24 may generate a balanced load resource usage profile 50 based on the light load resource usage profile 42 and the heavy load resource usage profile 46. In this example, the resource usage profile generator 24 generates a plurality of resource values 52-1-52-8 by averaging the resource values 44-1-44-8 and the resource values 48-1-48-8, however, any suitable formula may be used to generate the balanced load resource usage profile 50 from the light load resource usage profile 42 and the heavy load resource usage profile 46. The resource values 52-1-52-8 correspond to the same computing resources as the resource values 44-1-44-8 and the resource values 48-1-48-8.

The resource usage profile generator 24 may similarly generate a plurality of resource usage profiles for the application 22-N.

It is noted that because the resource usage profile generator 24 is a component of the computing device 12, functionality implemented by the resource usage profile generator 24 may be attributed to the computing device 12. Moreover, in examples where the resource usage profile generator 24 comprises software instructions that program the processor device 16 to carry out functionality discussed herein, functionality implemented by the resource usage profile generator 24 may be attributed herein to the processor device 16.

Figure 2A:
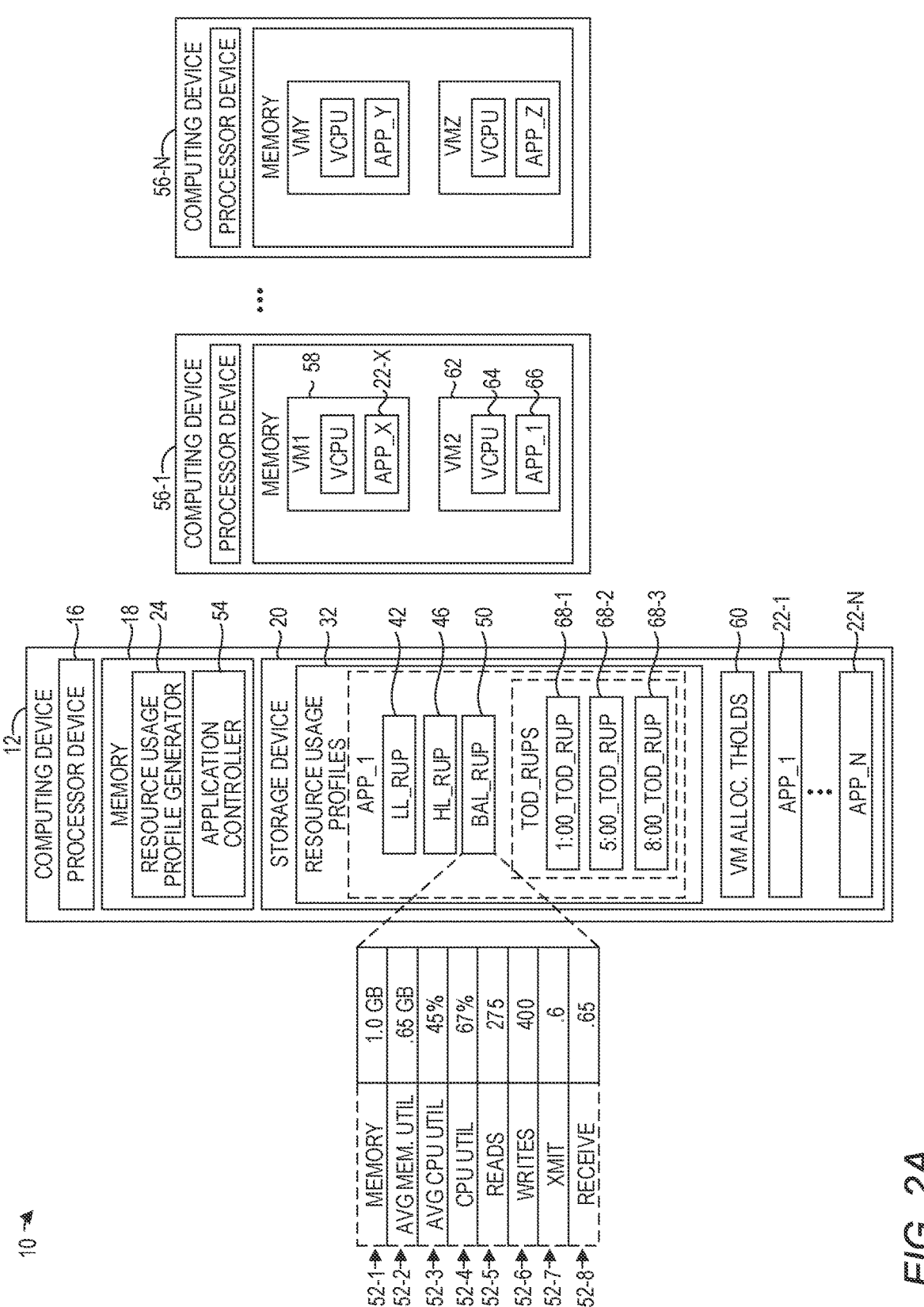
FIG. 2A is a block diagram of the environment illustrated in FIG. 1 according to another implementation.

FIG. 2A is a block diagram of the environment 10 according to another implementation. It is noted that certain elements illustrated in FIG. 1 not necessary for the discussion of FIGS. 2A and 2B have been omitted due to space limitations. In this implementation, the computing device 12 includes an application controller 54 that is configured to initiate, or cause the initiation of, an instance of the application 22 onto one or more computing devices 56-1-56-N upon request or in response to a condition or criteria. In this example, the environment 10 is a cloud computing environment that provides cloud computing services to multiple customers, referred to herein as tenants. To ensure isolation between applications of different tenants, the application controller 54 initiates, or causes the initiation of a VM, and then initiates, or causes the initiation of, an instance of the application 22 in the VM.

In this example, assume that the application controller 54 determines that an instance of the application 22-1 is to be initiated on a computing device 56. This determination could be in response to an operator or programmatic command, a schedule, or some other condition. The application controller 54 selects the computing device 56-1, which already has a VM 58 executing an application 22-X. The selection of the computing device 56-1 may be the result of an analysis of the current loads of the computing devices 56-1-56-N, or based on any other criterion or algorithm.

The application controller 54 may select the balanced load resource usage profile 50. The application controller 54 analyzes the resource values in the balanced load resource usage profile 50. The application controller 54 may utilize predetermined VM allocation thresholds 60 or any other suitable criteria to determine the computing resources that should be allocated to a VM for the purpose of executing an instance of the application 22-1. As an example, the VM allocation thresholds 60 may indicate that an amount of virtual memory equal to the average memory utilization multiplied by a factor of 1.5 should be allocated to the VM. The VM allocation thresholds 60 may indicate that a single VCPU should be allocated to the VM if the average processor utilization is less than 70%, and two VCPUs should be allocated to the VM if the average processor utilization is 70% or greater. Based on the resource value 52-2 and the VM allocation thresholds 60, the application controller 54 determines that 1 GB of virtual memory is to be allocated to the VM (0.65 GB*1.5) and, based on the resource value 52-3, that one VCPU is to be allocated to the VM.

The application controller 54 initiates, or causes to be initiated, a VM 62 on the computing device 56-1 with an allocation of 1 GB of memory and 1 VCPU 64. The application controller 54 then initiates, or causes to be initiated, an instance 66 of the application 22-1 in the VM 62. The application controller 54 may store information that indicates the balanced load resource usage profile 50 was used to initiate the instance 66.

In some implementations, the application controller 54 or the resource usage profile generator 24 may monitor a production instance of the application 22-1, such as the instance 66, to generate additional resource usage profiles based on a time-of-day operational condition. In this example, the resource usage profile generator 24 is configured to generate three time-of-day resource usage profiles 68-1-68-3 (generally, time-of-day resource usage profiles 68). The time-of-day resource usage profile 68-1 will identify resource values that quantify real-time computing resources used by the instance 66 at 1:00 PM; the time-of-day resource usage profile 68-2 will identify resource values that quantify real-time computing resources used by the instance 66 at 5:00 PM; and the time-of-day resource usage profile 68-3 will identify resource values that quantify real-time computing resources used by the instance 66 at 8:00 PM.

To generate, for example, the time-of-day resource usage profile 68-1, the resource usage profile generator 24 obtains real-time computing resources of the instance 66 from the computing device 56-1 over a period of time that spans 1:00 PM. The period of time, for example, may be from 12:55 PM to 1:05 PM, or any other suitable or desirable timeframe associated with 1:00 PM. The real-time computing resources may be obtained, for example, by iteratively sending requests to an operating system of the computing device 56-1, or to the operating system of the VM 62, for information that identifies computing resources used by the instance 66. Based on the information that identifies the computing resources used by the instance 66, the resource usage profile generator 24 generates the time-of-day resource usage profile 68-1, which may quantify the same real-time computing resources quantified by the resource values in the resource usage profiles 42, 46, and 50. The resource usage profile generator 24 generates the time-of-day resource usage profiles 68-2 and 68-3 in a similar manner at the appropriate respective times. Each of the time-of-day resource usage profiles 68 has associated information that identifies the time of day to which the respective time-of-day resource usage profile 68 corresponds. Such information may, for example, be maintained in metadata, may be stored as part of the file names of the time-of-day resource usage profiles 68, or may be maintained in a header of the time-of-day resource usage profiles 68.

Subsequently, assume that the application controller 54 determines that another instance of the application 22-1 is to be initiated on a computing device 56. The application controller 54 accesses the storage device 20 and determines that the plurality of time-of-day resource usage profiles 68 exist. The application controller 54 identifies the current time and selects the particular time-of-day resource usage profile 68 that corresponds to a time of day closest to the current time of day. The application controller 54 may then use the selected time-of-day resource usage profile 68 and the VM allocation thresholds 60 to determine the computer resources that should be allocated to a new VM in which to initiate the additional instance of the application 22-1, in the manner discussed above with regard to the instance 66.

Figure 2B:
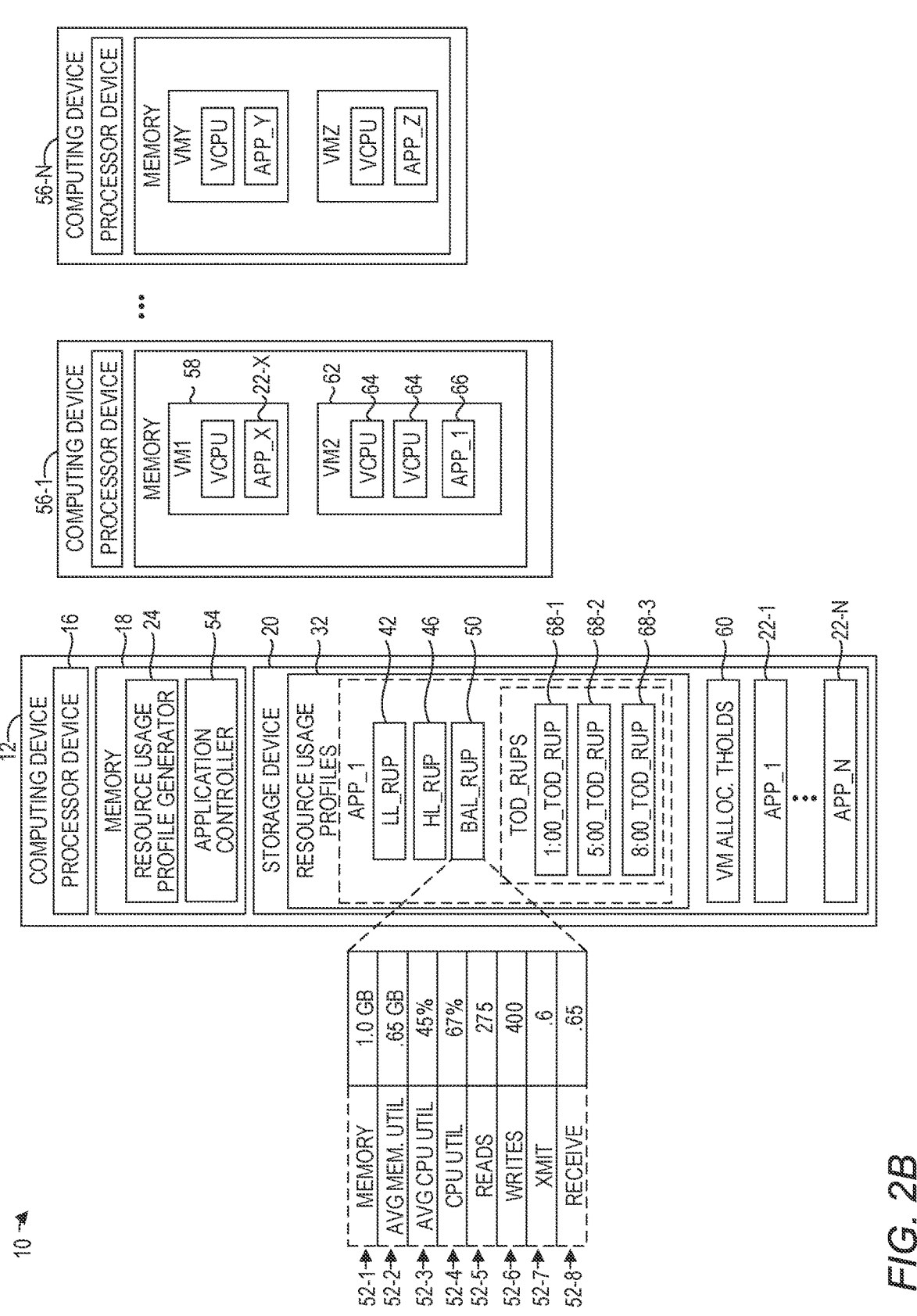
FIG. 2B is a block diagram of the environment illustrated in FIG. 2A at a later point in time than that illustrated in FIG. 2A.

Referring now to FIG. 2B, the application controller 54 monitors the instance 66 by iteratively obtaining real-time computing resources used by the instance 66 from the computing device 56-1. At some point in time, the application controller 54 determines that the instance 66 is exceeding certain predetermined memory and processor utilization thresholds. For example, the application controller 54 determines that the instance 66 has been utilizing more than 95% of the memory allocated to the VM 62 for longer than 3 minutes, resulting in substantial memory page swaps based on the real-time computing resources. The application controller 54 also determines that the instance 66 has been utilizing more than 90% of the VCPU 64 for one minute. The application controller 54 determines that the instance 66 may be experiencing a heavier load than suitable for the balanced load resource usage profile 50. The application controller 54 accesses the heavy load resource usage profile 46. The application controller 54 modifies the allocation of memory and VCPUs of the VM 62 based on the heavy load resource usage profile 46 and the VM allocation thresholds 60. In particular, the application controller 54 determines that the new memory allocation should be 1.35 GB (0.9 GB*1.5) and that the VM 62 should have two VCPUs 64. The application controller 54 causes the computing device 56-1 to increase the memory allocation of the VM 62 to 1.35 GB, and to allocate an additional VCPU 64 to the VM 62.

The application controller 54 may continue to monitor the instance 66 over time and make similar computer resource adjustments to the VM 62 as appropriate. If the application controller 54 subsequently determines that the instance 66 is utilizing substantially less computer resources according to predetermined usage thresholds, the application controller 54 may repeat the process of determining appropriate memory and processor utilization allocations based on the light load resource usage profile 42, for example, and reduce the memory and VCPU allocation of the VM 62.

The application controller 54 implements this process for all VMs executing on the computing devices 56-1-56-N. In this manner, the application controller 54 ensures that the VMs executing on the computing devices 56 have computer resource allocations that are suitable for the instances executing in the VMs, and thus ensures that the VMs are neither overallocated computer resources nor underallocated computer resources.

It is noted that, because the application controller 54 is a component of the computing device 12, functionality implemented by the application controller 54 may be attributed to the computing device 12. Moreover, in examples where the application controller 54 comprises software instructions that program the processor device 16 to carry out functionality discussed herein, functionality implemented by the application controller 54 may be attributed herein to the processor device 16.

It is further noted that while the resource usage profile generator 24 and the application controller 54 are shown as separate components, in other implementations, the resource usage profile generator 24 and the application controller 54 could be implemented in a single component or could be implemented in a greater number of components than two. Finally, it is noted that while, for purposes of illustration and simplicity, the examples are illustrated as being implemented by a single computing device 12 having a single processor device 16, in other environments, such as a distributed and/or clustered environment, the examples may be implemented on a computer system that includes a plurality of processor devices of a plurality of different computing devices, and functionality of the examples may be implemented on different processor devices of different computing devices. Thus, irrespective of the implementation, the examples may be implemented on a computer system that includes one or more processor devices of one or more computing devices.

FIG. 3 is a flowchart of a method for application execution environment selection based on resource usage profiles according to one implementation. FIG. 3 will be discussed in conjunction with FIGS. 1 and 2A-2B. The computing device 12 generates the plurality of resource usage profiles 42, 46, and 50, at least two of the resource usage profiles 42 and 46 each comprising a corresponding plurality of resource values 44 and 48 that quantify real-time computing resources used by the instance 40 of the application 22-1 that previously executed under two different corresponding operating conditions (FIG. 3, block 1000). The computing device 12 determines that a new instance of the application 22-1 is to be initiated (FIG. 3, block 1002). The computing device 12 selects the resource usage profile 50 from the from the plurality of resource usage profiles 42, 46, and 50 (FIG. 3, block 1004). The computing device 12 initiates the new instance 66 using the resource usage profile 50 (FIG. 3, block 1006).

Figure 4A:
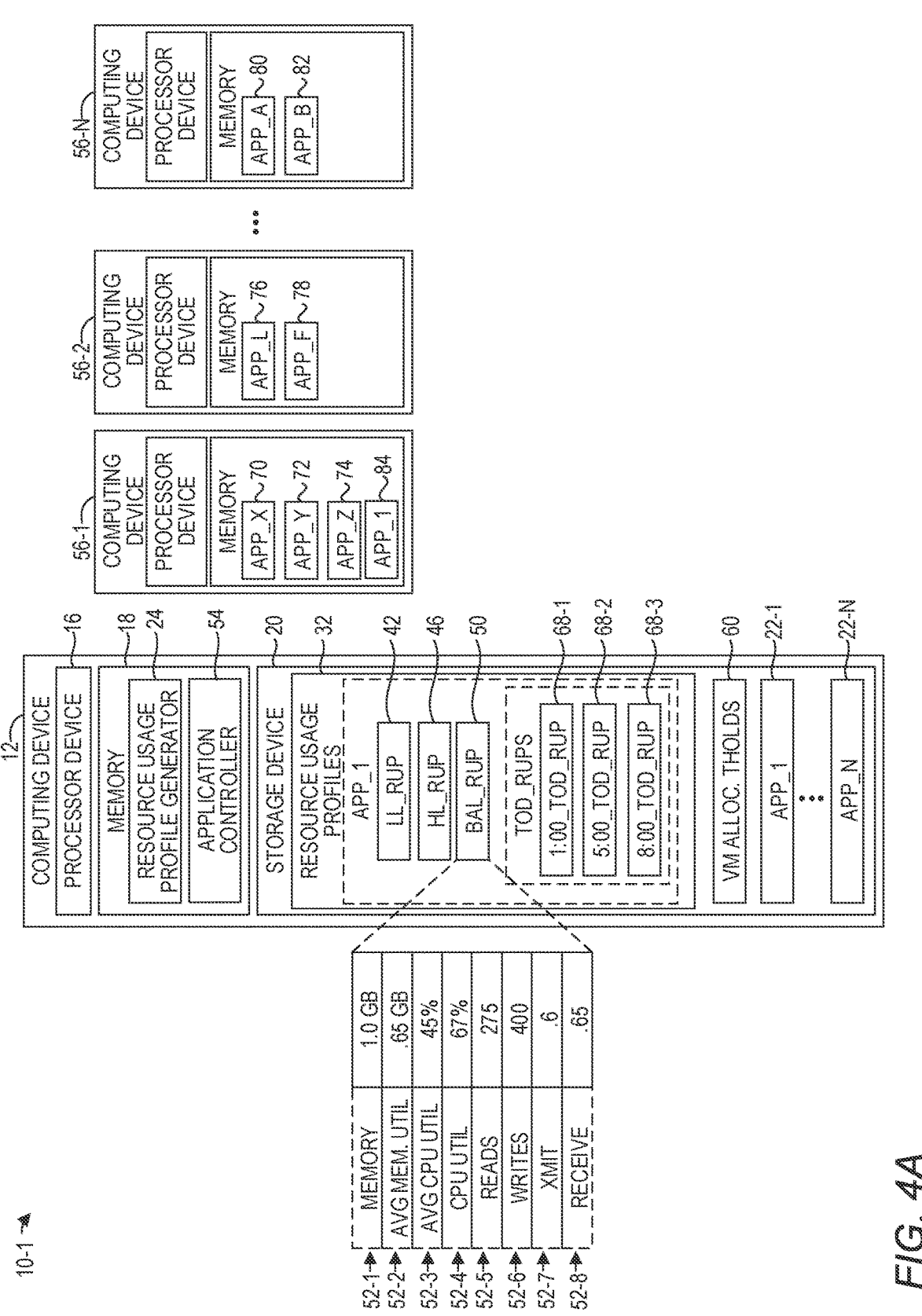
FIG. 4A is a block diagram of another environment suitable for generating one or more resource usage profiles that can subsequently be used for application execution environment selection.

FIG. 4A is a block diagram of an environment 10-1 according to another implementation. The environment 10-1 is substantially similar to the environment 10, except as otherwise discussed herein. In this example, the application controller 54 uses the resource usage profiles 42, 46, 50, and 68 and real-time execution statistics of the computing devices 56-1-56-N to select a particular computing device 56 on which to initiate an instance of an application 22. The computing device 56-1 currently executes an instance 70 of an application X, an instance 72 of an application Y, and an instance 74 of an application Z. The computing device 56-2 currently executes an instance 76 of an application L, and an instance 78 of an application F. The computing device 56-N currently executes an instance 80 of an application A, and an instance 82 of an application B.

Assume, again, that the application controller 54 determines that an instance of the application 22-1 is to be initiated on a computing device. Again, this determination could be in response to an operator or programmatic command, a schedule, or some other condition. The application controller 54 may select the balanced load resource usage profile 50 or a time-of-day resource usage profile 68 based on the current time of day. In this example, assume that the application controller 54 selects the balanced load resource usage profile 50. The application controller 54 obtains real-time execution statistics of the computing devices 56-1-56-N. The real-time execution statistics may include, for example, an amount of available memory, a number of processor cores, an amount of available processor capacity, and any other useful operational characteristics of the computing devices 56-1-56-N.

The application controller 54 accesses the resource values 52-1-52-8 of the balanced load resource usage profile 50 and, based on the resource values 52-1-52-8 and the real-time execution statistics, selects a particular computing device 56-1. For example, the computing device 56-1 may have current processor utilization and memory available to provide an instance of the application 22-1 with the memory and processor utilization identified in the balanced load resource usage profile 50. The application controller 54 initiates, or causes to be initiated, an instance 84 on the computing device 56-1.

The application controller 54 may also obtain computing device characteristic information about the computing devices 56-1-56-N that identifies characteristics of the computing devices 56-1-56-N. The computing device characteristic information may include computing device metadata that identifies, by way of non-limiting example, a total amount of memory installed on each computing device 56, the total number of processor cores of each computing device 56, and the types of processor devices each computing device 56. The computing device characteristic information may include storage device metadata that identifies, by way of non-limiting example, the types of storage device types to which the computing devices 56 are connected, such as solid state or conventional electro-mechanical storage devices, the amount of storage space available on such storage devices, and the like. The computing device characteristic information may include network metadata that identifies, by way of non-limiting example, the number of transceivers installed on the computing devices 56, the types of transceivers, the speeds of the transceivers and the like.

In some situations, the application controller 54 may select a particular computing device 56 based on the computing device characteristic information. For example, for an application that a resource usage profile indicates performs a substantial number of reads and/or writes, the application controller 54 may use the computing device characteristic information to select a computing device 56 that is connected to a solid state storage device rather than a conventional electro-mechanical storage device. For an application that a resource usage profile indicates performs a large number and amount of network transmits and/or receives, the application controller 54 may use the computing device characteristic information to select a computing device 56 that has a 1 Gbps transceiver rather than a 100 Mbps transceiver.

Figure 4B:
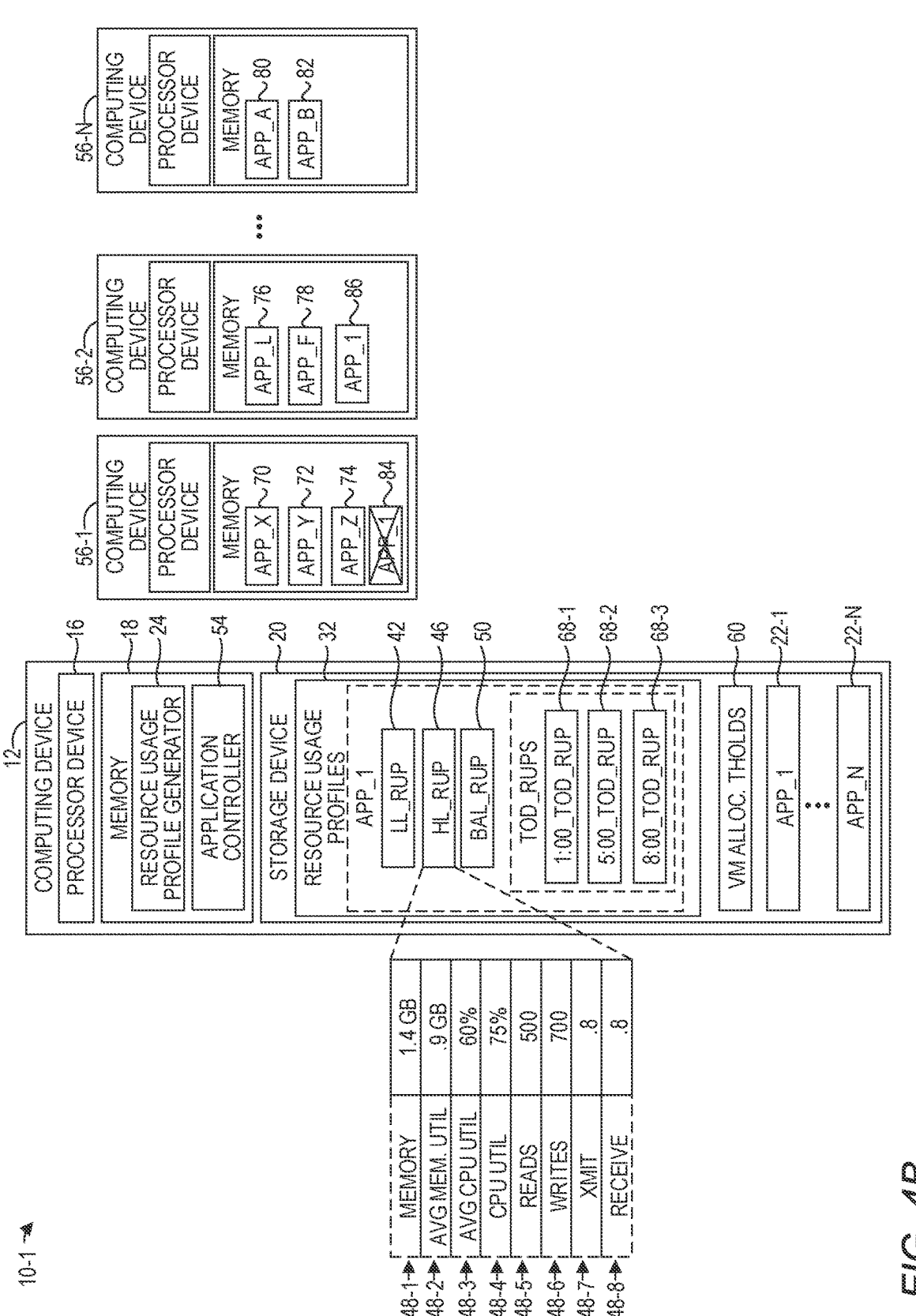
FIG. 4B is a block diagram of the environment illustrated in FIG. 4A at a later point in time than that illustrated in FIG. 4A.

Referring now to FIG. 4B, the application controller 54 monitors the instance 84 by iteratively obtaining real-time computing resources used by the instance 84 from the computing device 56-1. At some point in time, the application controller 54 determines that the instance 66 is exceeding certain predetermined memory and processor utilization thresholds. For example, the application controller 54 determines that the instance 66 has been utilizing more than 95% of the memory of the computing device 56-1, resulting in substantial memory page swaps based on the real-time computing resources. The application controller 54 also determines that the instance 84 has been utilizing more than 90% of the capacity of the processor device of the computing device 56-1. The application controller 54 thus determines that the instance 84 may be experiencing a heavier load than suitable for the balanced load resource usage profile 50. The application controller 54 accesses the heavy load resource usage profile 46. Based on the resource value 48-2, the application controller 54 determines that the instance 84 should have at least 1.35 GB (0.9 GB*1.5) of memory available to execute. Based on the resource value 48-3, the application controller 54 determines that the instance 84 should have access to a processor device or a processor core the capacity of which the instance 84 can utilize 60% on average.

The application controller 54 queries the computing devices 56-2-56-N to obtain real-time execution statistics of the computing devices 56-2-56-N. The application controller 54 determines that the computing device 56-2 has 1.5 GB of memory available, and has six processor cores, two of which are at a 10% utilization. The application controller 54 determines that the application 22-1 should be migrated from the computing device 56-1 to the computing device 56-2. The application controller 54 initiates, or causes the initiation of an instance 86 on the computing device 56-2. The application controller 54 then terminates, or causes the termination of the instance 84 on the computing device 56-1.

The application controller 54 continuously monitors all instances of applications executing on the computing devices 56-1-56-N and implements migrations of such instances as needed in accordance with the respective resource usage profiles. In this manner, the application controller 54 ensures that the computing devices 56 are utilized in a most efficient manner and that the instances of the applications are being provided with sufficient computing resources.

Figure 5:
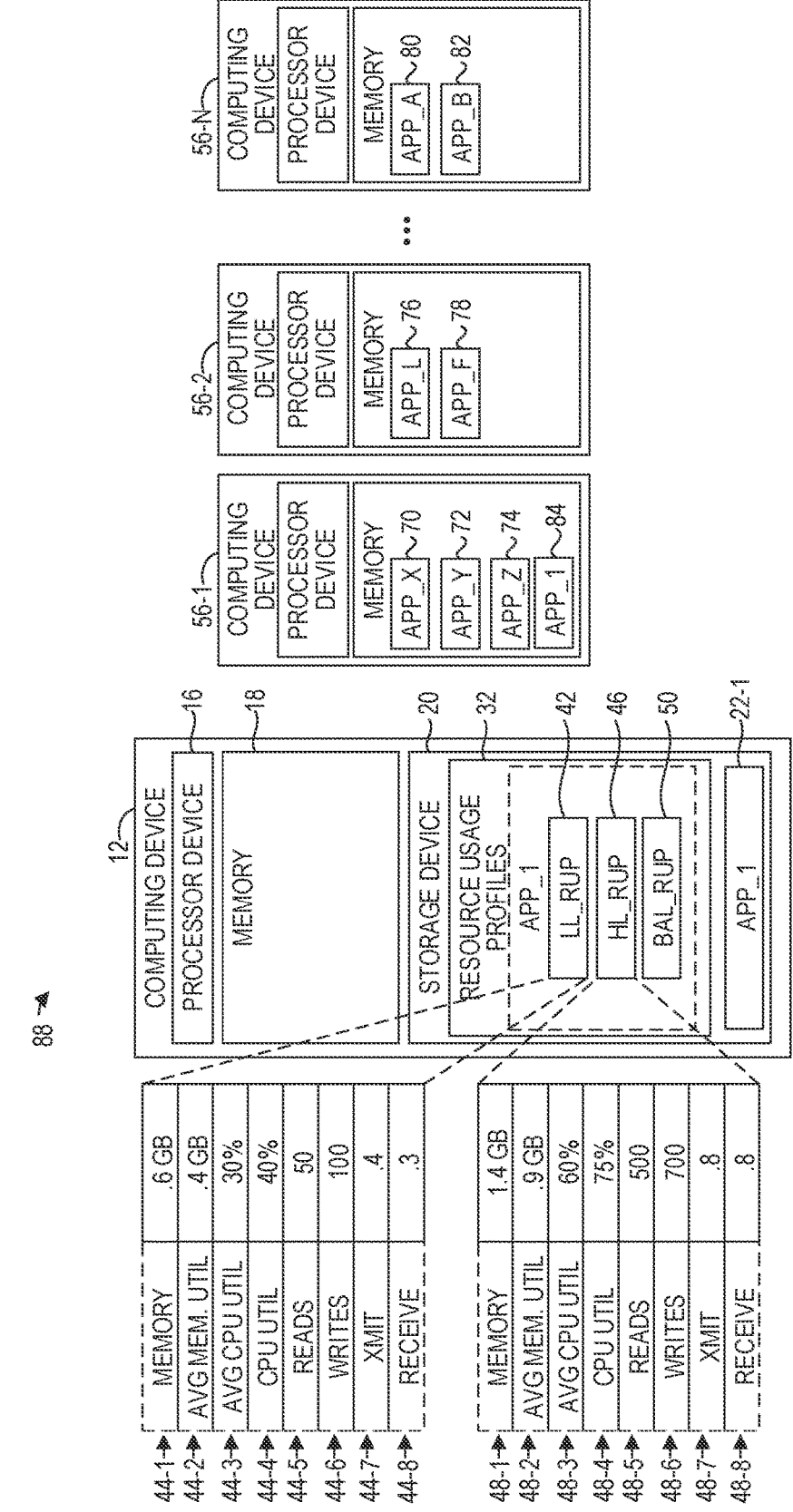
FIG. 5 is a simplified block diagram of the environment illustrated in FIGS. 4A and 4B.

FIG. 5 is a simplified block diagram of the environment 10-1 according to another implementation. The environment 10-1 includes a computer system 88 that includes one or more processor devices 16 (only one illustrated) of one or more computing devices 12 (only one illustrated). The one or more processor devices 16 are to generate the plurality of resource usage profiles 42, 46, and 50. At least two of the resource usage profiles 42 and 46 each comprise a corresponding plurality of resource values 44, 48, respectively, that quantify real-time computing resources used by an instance of the application 22-1 that previously executed under two different corresponding operating conditions. The one or more processor devices 16 determine that a new instance of the application 22-1 is to be initiated. The one or more processor devices 16 select the particular resource usage profile 50 from the plurality of resource usage profiles 42, 46, and 50, and initiate the new instance 84 using the particular resource usage profile 50.

Figure 6:
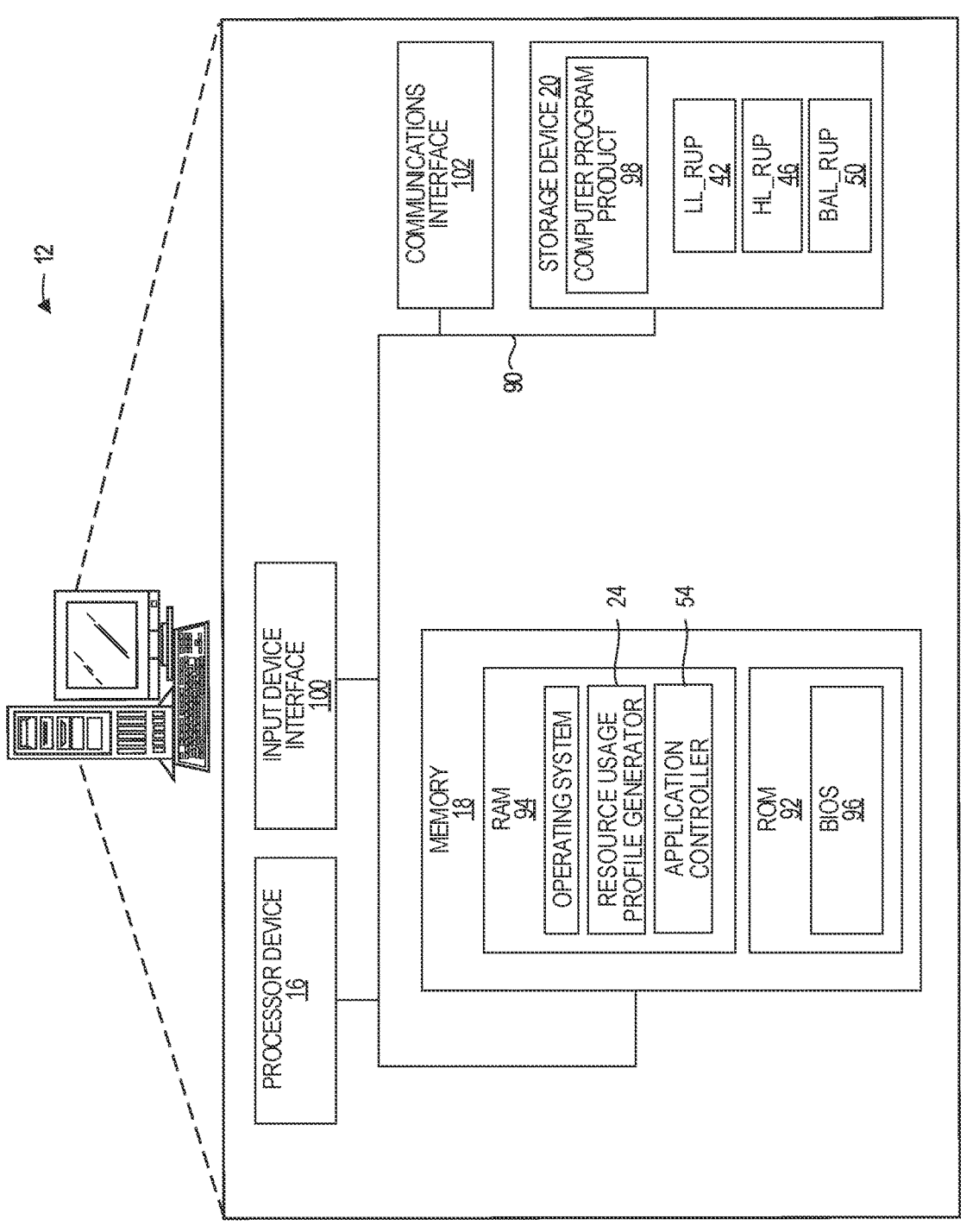
FIG. 6 is a block diagram of a computing device suitable for implementing examples disclosed herein.

FIG. 6 is a block diagram of the computing device 12 suitable for implementing examples according to one example. The computing device 12 may comprise any computing or electronic device capable of including firmware, hardware, and/or executing software instructions to implement the functionality described herein, such as a computer server, a desktop computing device, a laptop computing device, or the like. The computing device 12 includes the processor device 16, the system memory 18, and a system bus 90. The system bus 90 provides an interface for system components including, but not limited to, the system memory 18 and the processor device 16. The processor device 16 can be any commercially available or proprietary processor.

The system bus 90 may be any of several types of bus structures that may further interconnect to a memory bus (with or without a memory controller), a peripheral bus, and/or a local bus using any of a variety of commercially available bus architectures. The system memory 18 may include non-volatile memory 92 (e.g., read-only memory (ROM), erasable programmable read-only memory (EPROM), electrically erasable programmable read-only memory (EEPROM), etc.), and volatile memory 94 (e.g., random-access memory (RAM)). A basic input/output system (BIOS) 96 may be stored in the non-volatile memory 92 and can include the basic routines that help to transfer information between elements within the computing device 12. The volatile memory 94 may also include a high-speed RAM, such as static RAM, for caching data.

The computing device 12 may further include or be coupled to a non-transitory computer-readable storage medium such as the storage device 20, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 20 and other drives associated with computer-readable media and computer-usable media may provide non-volatile storage of data, data structures, computer-executable instructions, and the like.

A number of modules can be stored in the storage device 20 and in the volatile memory 94, including an operating system and one or more program modules, such as the resource usage profile generator 24 and the application controller 54, which may implement the functionality described herein in whole or in part. All or a portion of the examples may be implemented as a computer program product 98 stored on a transitory or non-transitory computer-usable or computer-readable storage medium, such as the storage device 20, which includes complex programming instructions, such as complex computer-readable program code, to cause the processor device 16 to carry out the steps described herein. Thus, the computer-readable program code can comprise software instructions for implementing the functionality of the examples described herein when executed on the processor device 16.

An operator may also be able to enter one or more configuration commands through a keyboard (not illustrated), a pointing device such as a mouse (not illustrated), or a touch-sensitive surface such as a display device. Such input devices may be connected to the processor device 16 through an input device interface 100 that is coupled to the system bus 90 but can be connected by other interfaces such as a parallel port, an Institute of Electrical and Electronic Engineers (IEEE) 1394 serial port, a Universal Serial Bus (USB) port, an IR interface, and the like. The computing device 12 may also include a communications interface 102, such as an Ethernet transceiver, suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:

generating, by a computer system comprising one or more processor devices, a plurality of resource usage profiles comprising a corresponding plurality of resource values that quantify real-time computing resources used by a production instance of an application that previously executed under two different corresponding operating conditions;

determining, by the computer system, that a new instance of the application is to be initiated;

selecting, by the computer system, a particular resource usage profile from the plurality of resource usage profiles;

determining, based on the selected particular resource usage profile, that the new instance of the application requires a particular performance metric or resource usage allocation;

obtaining computing resource metadata for each of a plurality of computing devices;

determining, using the obtained computing resource metadata, that a first computing device of the plurality of computing devices has access to computing resources sufficient to meet the particular performance metric or resource usage allocation; and initiating the new instance using the particular resource usage profile on the first computing device.

2. The method of claim 1, wherein a first operating condition of the two different corresponding operating conditions comprises a light load operating condition, and wherein generating a first resource usage profile of the plurality of resource usage profiles comprises:

initiating a first test instance of the application;

providing data to the first test instance in accordance with a light load test process;

generating the corresponding plurality of resource values based on the real-time computing resources of the first test instance during the light load test process; and storing the corresponding plurality of resource values in the first resource usage profile.

3. The method of claim 2, further comprising:

sending a request to an operating system to obtain information that identifies the real-time computing resources of the first test instance of the application during the light load test process; and generating the corresponding plurality of resource values based on the real-time computing resources.

4. The method of claim 3, wherein a second operating condition of the two different corresponding operating conditions comprises a heavy load operating condition, and wherein generating a second resource usage profile of the plurality of resource usage profiles comprises:

providing data to a second test instance in accordance with a heavy load test process;

generating the corresponding plurality of resource values based on the real-time computing resources of the second test instance during the heavy load test process; and storing the corresponding plurality of resource values in the second resource usage profile.

5. The method of claim 4, wherein generating the plurality of resource usage profiles further comprises generating a balanced resource usage profile based on the first resource usage profile and the second resource usage profile.

6. The method of claim 1, wherein the plurality of resource usage profiles comprises a plurality of time-of-day resource usage profiles that correspond to a plurality of different times of a day, and further comprising:

generating the plurality of time-of-day resource usage profiles by:

monitoring the real-time computing resources of the production instance of the application at the plurality of different times of the day; and generating, for each time of the day of the plurality of different times of the day, a time-of-day resource usage profile comprising a corresponding plurality of resource values that quantify the real-time computing resources used by the production instance at the corresponding time of day.

7. The method of claim 1, wherein the plurality of resource values of a first resource usage profile of the plurality of resource usage profiles comprises one or more of a first processor utilization value that quantifies an amount of processor device utilization of a test instance of the application, a second processor utilization value that quantifies an amount of processor device utilization of the test instance of the application over a predetermined period of time, a memory utilization value that quantifies an amount of memory utilization of the test instance of the application, a read value that quantifies a number of storage device reads that the test instance of the application has initiated over a predetermined period of time, and a write value that quantifies a number of storage device writes that the test instance of the application has initiated over a predetermined period of time.

8. The method of claim 1, wherein selecting the particular resource usage profile from the plurality of resource usage profiles comprises:

identifying a current time of day;

accessing a plurality of time-of-day resource usage profiles of the plurality of resource usage profiles, each time-of-day resource usage profile corresponding to a particular time of day; and selecting a particular time-of-day resource usage profile that corresponds to a time of day closest to the current time of day.

9. The method of claim 1, wherein obtaining the computing resource metadata for each of the plurality of computing devices comprises:

obtaining real-time execution environment statistics of the plurality of computing devices; and wherein determining that the first computing device has access to computing resources sufficient to meet the particular performance metric or resource usage allocation comprises:

selecting the first computing device from the plurality of computing devices based on the plurality of resource values identified in the particular resource usage profile and the real-time execution environment statistics of the first computing device.

10. The method of claim 1, wherein determining that the new instance of the application requires the particular performance metric or resource usage allocation comprises:

determining a number of virtual central processing units (VCPUs) based on the plurality of resource values in the particular resource usage profile;

determining an amount of virtual memory based on the plurality of resource values in the particular resource usage profile;

wherein initiating the new instance using the particular resource usage profile on the first computing device comprises:

causing an initiation of a virtual machine with the number of VCPUs and the amount of virtual memory on the first computing device; and causing the initiation of the new instance in the virtual machine.

11. The method of claim 1, wherein determining that the new instance of the application requires the particular performance metric or resource usage allocation comprises:

determining, based on the particular resource usage profile, that the production instance of the application performs an amount of input/output operations beyond a threshold number of input/output operations;

wherein obtaining the computing resource metadata for each of the plurality of computing devices comprises:

obtaining storage device metadata for each of the plurality of computing devices, the storage device metadata identifying storage device types of storage devices connected to the plurality of computing devices; and wherein determining that the first computing device has access to computing resources sufficient to meet the particular performance metric or resource usage allocation comprises:

determining that the first computing device is connected to a storage device having a storage device type sufficient to perform the amount of input/output operations beyond the threshold number of input/output operations.

12. The method of claim 1, further comprising:

monitoring the new instance by iteratively obtaining the real-time computing resources used by the new instance;

determining that the new instance is utilizing a greater amount of the real-time computing resources than identified in the particular resource usage profile;

accessing a different resource usage profile that comprises a plurality of resource values that have greater values than the plurality of resource values in the particular resource usage profile;

selecting a second computing device of the plurality of computing devices based on the different resource usage profile;

initiating another instance of the application on the second computing device; and terminating the new instance of the application on the first computing device.

13. The method of claim 1, wherein initiating the new instance using the particular resource usage profile on the first computing device comprises initiating the new instance in a first virtual machine of the first computing device that has an allocated amount of memory based on the particular resource usage profile, and further comprising:

monitoring the new instance by iteratively obtaining the real-time computing resources used by the new instance;

determining that the new instance is utilizing a greater amount of memory than identified in the particular resource usage profile;

accessing a different resource usage profile that comprises a plurality of resource values that have greater values than the plurality of resource values in the particular resource usage profile; and modifying the virtual machine to provide the virtual machine a greater amount of memory than the allocated amount of memory.

14. The method of claim 1, wherein the production instance of the application is executed under differing conditions, wherein the differing conditions comprise:

load conditions determined using a first test instance of the application; and time-of-day conditions determined using a second test instance of the application.

15. A computer system comprising:

one or more processor devices of one or more computing devices, the one or more processor devices to:

generate a plurality of resource usage profiles comprising a corresponding plurality of resource values that quantify real-time computing resources used by a production instance of an application that previously executed under two different corresponding operating conditions;

determine that a new instance of the application is to be initiated;

select a particular resource usage profile from the plurality of resource usage profiles;

determine, based on the selected particular resource usage profile, that the new instance of the application requires a particular performance metric or resource usage allocation;

obtain computing resource metadata for each of a plurality of computing devices;

determine, using the obtained computing resource metadata, that a first computing device of the plurality of computing devices has access to computing resources sufficient to meet the particular performance metric or resource usage allocation; and initiate the new instance using the particular resource usage profile on the first computing device.

16. The computer system of claim 15, wherein a first operating condition of the two different corresponding operating conditions comprises a light load operating condition, and wherein to generate a first resource usage profile of the plurality of resource usage profiles, the one or more processor devices are further to:

initiate a test instance of the application;

provide data to the test instance in accordance with a light load test process;

generate the corresponding plurality of resource values based on the real-time computing resources of the test instance during the light load test process; and store the corresponding plurality of resource values in the first resource usage profile.

17. The computer system of claim 15, wherein to obtain the computing resource metadata for each of the plurality of computing devices, the one or more processor devices are further to:

obtain real-time execution environment statistics of the plurality of computing devices; and wherein to determine that the first computing device has access to computing resources sufficient to meet the particular performance metric or resource usage allocation, the one or more processor devices are further to:

select the first computing device from the plurality of computing devices based on the plurality of resource values identified in the particular resource usage profile and the real-time execution environment statistics of the first computing device.

18. The computer system of claim 15, wherein to determine that the new instance of the application requires the particular performance metric or resource usage allocation, the one or more processor devices are further to:

determine a number of virtual central processing units (VCPUs) based on the plurality of resource values in the particular resource usage profile;

determine an amount of virtual memory based on the plurality of resource values in the particular resource usage profile; and wherein to initiate the new instance using the particular resource usage profile on the first computing device, the one or more processor devices are further to:

cause an initiation of a virtual machine with the number of VCPUs and the amount of virtual memory on the first computing device; and cause the initiation of the new instance in the virtual machine.

19. A non-transitory computer-readable storage medium that includes executable instructions to cause one or more processor devices to:

generate a plurality of resource usage profiles comprising a corresponding plurality of resource values that quantify real-time computing resources used by a production instance of an application that previously executed under two different corresponding operating conditions;

determine that a new instance of the application is to be initiated;

select a particular resource usage profile from the plurality of resource usage profiles;

determine, based on the selected particular resource usage profile, that the new instance of the application requires a particular performance metric or resource usage allocation;

obtain computing resource metadata for each of a plurality of computing devices;

determine, using the obtained computing resource metadata, that a first computing device of the plurality of computing devices has access to computing resources sufficient to meet the particular performance metric or resource usage allocation; and initiate the new instance using the particular resource usage profile on the first computing device.

20. The non-transitory computer-readable storage medium of claim 19, wherein to obtain the computing resource metadata for each of the plurality of computing devices, the instructions further cause the one or more processor devices to:

obtain real-time execution environment statistics of the plurality of computing devices; and wherein to determine that the first computing device has access to computing resources sufficient to meet the particular performance metric or resource usage allocation, the instructions further cause the one or more processor devices to:

select the first computing device from the plurality of computing devices based on the plurality of resource values identified in the particular resource usage profile and the real-time execution environment statistics of the first computing device.

\* \* \* \* \*